July 21, 1970   K. E. OPAL   3,521,025

METHOD FOR WELDING

Filed Oct. 10, 1968

INVENTOR.
KENNETH E. OPAL
By Murray & Linkhauer
Attorneys

United States Patent Office 3,521,025
Patented July 21, 1970

3,521,025
METHOD FOR WELDING
Kenneth E. Opal, Oakmont, Pa., assignor to Power Control Corporation, Pittsburgh, Pa., a corporation of Pennsylvania
Filed Oct. 10, 1968, Ser. No. 766,533
Int. Cl. B23k 11/06, 11/10, 11/24
U.S. Cl. 219—117    8 Claims

ABSTRACT OF THE DISCLOSURE

A method for welding, particularly resistance seam welding, wherein the voltage applied across the weld comprises a steady-state direct current voltage having superimposed thereon an alternating current voltage or a chopped direct current voltage. This provides a true diffusion weld, results in a substantially uniform grain structure across the weld, and enables extremely high welding speeds.

BACKGROUND OF THE INVENTION

While not limited thereto, the present invention is particularly adapted for use in the welding of can bodies. In the past, most cans had been formed from tin plate sheets which are formed into a cylindrical shape and the two edges joined along a seam formed by overlapping, reversely-bent portions. This seam is then soldered and tinned; and in modern can-forming equipment, the entire process of joining, soldering and tinning can be achieved at a production rate of up to 500 cans per minute.

Recently, it has been found that plain "black plate," instead of tin plate, can be coated with various resins to provide satisfactory can bodies. Instead of forming a seam by overlapping reversely-bent portions which must then be soldered and tinned, the side seam in a black plate can body can be formed by welding overlapping edges of a flat sheet formed into a cylinder. This results in a small but highly significant savings in metal. While welded can bodies have many advantages, they have not found wide acceptance to date, the reason being that the production rate of such cans is lower than soldered cans because of limitations of existing welding equipment.

In order to successfully weld can bodies at high speeds, currents on the order of thousands of amperes are required. If current is applied to the welding head in the form of a steady direct current, a satisfactory weld may be produced at one end of the can; but at the other end, burning of the metal may result. This is believed to be due to propagation of heat from one end of the can to the other as the seam is being welded, resulting in too high a temperature and resultant burning at the trailing end.

In an effort to overcome these inherent problems of high speed seam welding, proposals have been made to chop the extremely high currents required at high frequencies, above 1000 cycles per second. This proposal would theoretically eliminate the problem of heat propagation and resultant burning incurred with a steady-state direct current voltage. However, it is virtually impossible to chop extremely high currents at the frequencies required. For example, the inherent line inductance and time constant of the system limits the rate at which switching can occur at high current levels; and, in any event, the chopping equipment required for such applications is extremely expensive.

SUMMARY OF THE INVENTION

As an overall object, the present invention seeks to provide a new and improved seam welding method which achieves higher speeds and better quality welds than any known welding method.

More specifically, an object of the invention is to provide a welding method of the type described wherein a high frequency, chopped direct current of relatively low amplitude is superimposed on a steady-state direct current of greater amplitude.

In accordance with one embodiment of the invention, overlapped metal edges are passed between electrodes, a steady-state direct current of relatively high amplitude is impressed across the electrodes which is sufficient to raise the temperature of the metal to a point slightly below its melting temperature, and high frequency direct current pulses are superimposed on the steady-state direct current, the pulses being of sufficient magnitude to raise the temperature of the metal to its fusion temperature and thus produce along the seam a line of contiguous weld points.

In this manner, it is necessary to chop direct currents of relatively low amperages only; however when these are superimposed on the steady-state direct current which itself will not cause welding, a weld of exceptionally good quality is produced at extremely high line speeds.

As will be understood, the frequency of the direct current pulses should increase as the speed of the workpiece being welded increases. At workpiece speeds of about three feet per second, for example, the frequency of the pulses should be about 1.6 kilocycles to give a weld spot spacing of approximately 40 weld spots per inch. As the speed of the workpiece decreases, however, so also can the frequency of the pulses to maintain the same weld spacing.

The apparatus of the invention preferably comprises an inverter which produces a square-wave direct current output, the output of the inverter being doubled in a circuit similar to a full-wave rectifier and applied across the welding electrodes. Also applied across the electrodes is the steady-state direct current which is preferably about three times the magnitude of the pulses. An inductive choke in the line between the steady-state direct current source and the welding electrodes serves to isolate it from the pulse source.

The above and other objects and features of the invention will become apparent from the following detailed description taken in connection with the accompanying drawings which form a part of the specification, and in which.

Figure 1:
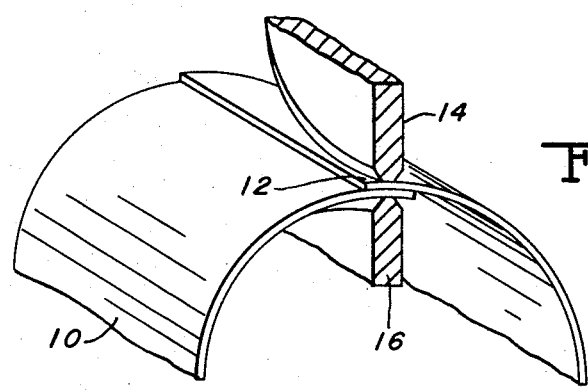
FIG. 1 is a perspective view showing the manner in which a can body is welded along a seam.

With reference now to the drawings, and particularly to FIG. 1, the upper portion of a can body 10 is shown comprising plain carbon "black plate" which is the name normally given to tin plate prior to tinning. The present invention is concerned with a method for welding the overlapped ends 12 of the can body formed from black plate. In the formation of the can body, a sheet of black plate, No. 29 gage or thinner, is initially wrapped around a mandrel to form a cylindrical shape with the ends of the sheet overlapped as at 12. Thereafter, the overlapped ends must be passed between the opposite electrodes 14 and 16 of a resistance welder at speeds as high as two feet per second. The electrodes 14 and 16 may comprise a pair of wheels, the lower wheel 16 being carried on the mandrel around which the can body is formed.

Figure 2:
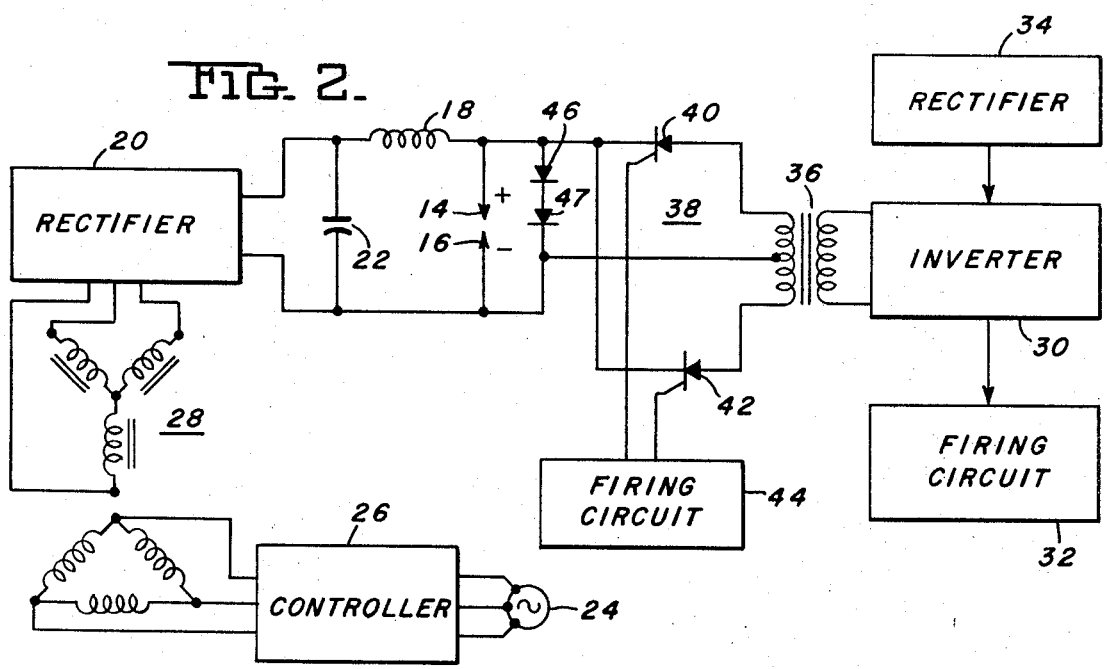
FIG. 2 is a schematic diagram of the welding apparatus of the present invention.

The welding apparatus itself is shown in FIG. 2 and includes the two welding electrodes 14 and 16 connected through an inductive choke 18 to a rectifier 20, the output of the rectifier being smoothed or filtered by means of capacitor 22. The power for the rectifier 20 is supplied from a source of three-phase alternating current 24. The current source 24 is connected to a controller, such as a Variac (trademark); while the controller is connected through a three-phase transformer 28 to the rectifier 20.

The circuitry also includes an inverter 30 of the semiconductive controlled rectifier type, the rectifiers in the inverter 30 being controlled by means of a conventional firing circuit 32. The inverter converts the direct current output from a rectifier 34 into a chopper or square-wave output appearing as waveform A in FIG. 3. Waveform A is applied through transformer 36 to a circuit 38 similar to a full-wave rectifier, but without an output smoothing capacitor. The circuit 38 includes a pair of silicon controlled rectifiers 40 and 42 having their anodes connected to the opposite ends of the secondary winding of transformer 36, and their cathodes connected to the upper welding electrode 14. The lower welding electrode 16, in turn, is connected to a center tap on the secondary winding of transformer 36. The gates of the silicon controlled rectifiers 40 and 42 are connected to a controllable firing circuit 44 such that the point at which the rectifiers fire during each half cycle of the applied waveform A can be controlled. In this manner, the power supplied across the welding electrodes 14 and 16 can be controlled by varying the firing angles of rectifiers 40 and 42 through firing circuit 44. The circuit is completed by means of diodes 46 and 47 which provide a current path to prevent arcing between the electrodes 14 and 16 when the electrodes leave the end of a can body. That is, with a welding potential established across the electrodes 14 and 16 with the polarity shown, the rectifiers 46 and 47 are not conducting because the potential across electrodes 14 and 16 is less than the contact potential of the two diodes 46 and 47 in series. However, when the can body leaves the welding electrodes and prior to making contact with the next can body, the energy stored in inductor 18 will be discharged through diodes 46 and 47 rather than across the electrodes 14 and 16, thereby minimizing arcing. The purpose of the inductor 18 is to isolate the rectifier 20 from the high frequency pulses produced at the output of circuit 38. In a circuit where the frequency of the pulses from circuit 38 is about 1.6 kilocycles, the inductance of inductor 18 should be about 40 microhenries.

In order to produce satisfactory welds at speeds of three feet per second, it is necessary to provide output pulses from circuit 38 at a frequency above 1000 cycles per second, preferably about 1.6 kilocycles. By virtue of the frequency doubling characteristics of the circuit 38, the output frequency from inverter 30 need be only 800 cycles per second for the example given. When doubled in circuit 38, therefore, the resulting pulses appearing as waveform B in FIG. 3 will have a frequency of 1.6 kilocycles. In the particular waveform given in FIG. 3, the firing angle of the silicon controlled rectifiers 40 and 42 is 90° and 270°, respectively. However, by increasing or decreasing the firing angle, the width of the pulses in waveform B can be correspondingly increased or decreased as well as the power supplied across the electrodes 14 and 16.

Figure 3:
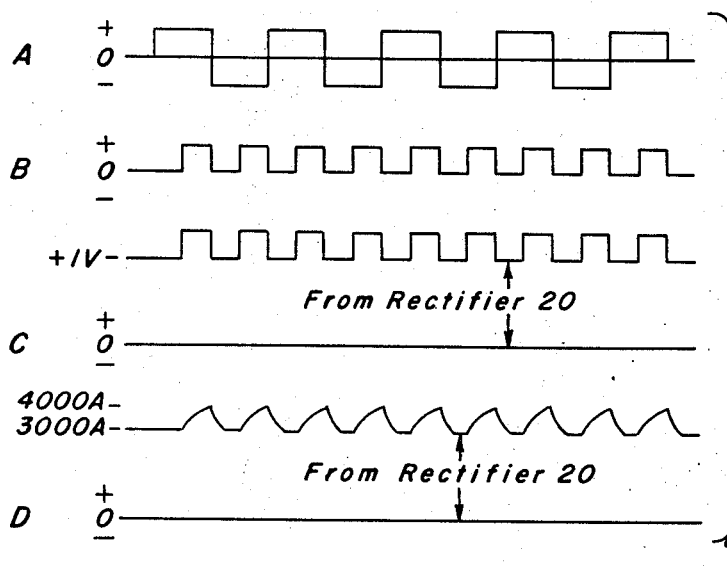
FIG. 3 illustrates waveforms appearing at various points in the circuit of FIG. 2.

The voltage appearing across the electrodes 14 and 16 appears as waveform C in FIG. 3. The voltage from rectifier 20 is at level of plus one volt; and superimposed on this are the pulses from waveform B which have a magnitude of about 0.3 volt. This produces a current wave shape across the electrodes illustrated as waveform D in FIG. 3 wherein current pulses of approximately 1000 amperes are superimposed on a steady-state current of about 3000 amperes supplied from the rectifier 20. From waveform D, it can be seen that by virtue of the fact that the pulses superimposed on the base current are of relatively low amplitude, the time constant of the circuit due to inherent line inductances will permit the 1000 ampere pulses to rise to their maximum levels at frequencies above 1000 cycles per second. This would not be the case, for example, where an attempt is made to chop the entire 4000 amperes.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that an alternating current could be superimposed on the direct current, rather than a chopped direct current, with equal effectiveness.

I claim as my invention:

1. A method for seam welding edges of a metallic workpiece, comprising the steps of producing relative movement between said edges and a pair of welding electrodes whereby the seam is traversed by the electrodes, impressing a steady-state direct current across the electrodes of a magnitude sufficient to raise the temperature of the edges to a point slightly below the melting point of the metallic workpiece, and superimposing on the steady-state direct current current pulses of sufficient magnitude to raise the temperature of the workpiece to its fusion temperature and thus produce along the seam a line of contiguous weld points.

2. The method of claim 1 wherein said edges are overlapped.

3. The method of claim 1 wherein said workpiece is a can body of No. 2 gage steel or thinner.

4. The method of claim 3 wherein the speed of said can body is above 1 foot per second and the frequency of said current pulses is above 1 kilocycle.

5. The method of claim 1 wherein the magnitude of said current pulses is about one-third of the magnitude of said steady-state direct current.

6. The method of claim 4 wherein the magnitude of said steady-state direct current is about 3000 amperes and the magnitude of said current pulses is about 1000 amperes.

7. The method of claim 1 wherein said electrodes are stationary and the workpiece moves.

8. The method of claim 1 wherein the workpiece is stationary and the electrodes move relative to the stationary workpiece.

References Cited

UNITED STATES PATENTS

| 2,021,477 | 11/1935 | Bohn | 219—108 X |
| 2,805,320 | 9/1957 | Palic | 219—108 |
| 3,361,892 | 1/1968 | Spencer | 219—131 |
| 3,449,544 | 6/1969 | Needham | 219—131 |

JOSEPH V. TRUHE, Primary Eaxminer

L. A. SCHUTZMAN, Assistant Examiner

U.S. Cl. X.R.

219—67, 83, 108, 131